US006928615B1

(12) United States Patent
Haitsuka et al.

(10) Patent No.: US 6,928,615 B1
(45) Date of Patent: Aug. 9, 2005

(54) INDEPENDENT INTERNET CLIENT OBJECT WITH AD DISPLAY CAPABILITIES

(75) Inventors: Stacy Haitsuka, Oak Park, CA (US); Ronald Burr, Agoura Hills, CA (US); Harold MacKenzie, Los Angeles, CA (US); Marwan Zebian, Agoura, CA (US); Terry Warren, Santa Ana, CA (US); Shane Blaser, Moorpark, CA (US)

(73) Assignee: NetZero, Inc., Woodland Hills, CA (US)

( * ) Notice: Subject to any disclaimer, the term of this patent is extended or adjusted under 35 U.S.C. 154(b) by 695 days.

(21) Appl. No.: 09/348,411

(22) Filed: Jul. 7, 1999

(51) Int. Cl.[7] .................................................. G09G 5/00
(52) U.S. Cl. ........................... 715/738; 715/739; 705/26
(58) Field of Search ................................ 345/738, 739, 345/745, 748, 749; 705/26, 27; 725/42, 41, 51

(56) References Cited

U.S. PATENT DOCUMENTS

| 5,105,184 A | 4/1992 | Pirani |
| 5,305,195 A | 4/1994 | Murphy |
| 5,319,455 A | 6/1994 | Hoarty |

(Continued)

(Continued)

FOREIGN PATENT DOCUMENTS

| CA | 2244002 | 7/1997 |
| CA | 2247325 | 9/1997 |
| CA | 2247330 | 9/1997 |
| EP | 923036 | 12/1997 |
| EP | 0 822 535 A2 | 2/1998 |
| GB | 2328537 | 11/1997 |

(Continued)

OTHER PUBLICATIONS

Henry Lieberman, *Letizia: An Agent That Assists Web Browsing*, Massachusetts Institute of Technology, pp. of 6.
Rick Dedrick, *Interactive Electronic Advertising*, Intel Corp., Media Delivery Lab., 1994 IEEE, pp. 55–66.

(Continued)

Primary Examiner—Ba Huynh
(74) Attorney, Agent, or Firm—SoCal IP Law Group; Steven C. Sereboff; Mark Andrew Goldstein

(57) ABSTRACT

In accordance with the present invention, there is provided a client application for enabling access to an online service and displaying advertisements while the user is accessing the online service. The client application receives play lists from the online service provider. The play lists include information about advertisements to be played and the order of play. The client application also receives match lists from the online service provider. The match lists include information about advertisements to be played when the user performs certain actions. The client application provides the user with the ability to cycle back through previously displayed advertisements, and to cycle forward. The client application displays advertisements continuously while the user is connected to and/or using the online service, and also displays advertisements during the delay between when the client application is activated and when the user can actually use the online service. In conjunction with the client application displaying advertisements, the client application also records which advertisements were played. The client application displays a number of icons for functions available to the user, and the client application records when the user selects these functions. The client application also records certain pre-connection events, such as dial-up errors.

23 Claims, 6 Drawing Sheets

U.S. PATENT DOCUMENTS

| | | | | |
|---|---|---|---|---|
| 5,347,632 | A | 9/1994 | Filepp | |
| 5,446,919 | A | 8/1995 | Wilkins | 455/6.2 |
| 5,504,675 | A | 4/1996 | Cragun | |
| 5,584,025 | A | 12/1996 | Keithley et al. | 707/104 |
| 5,636,346 | A | 6/1997 | Saxe | |
| 5,643,088 | A | 7/1997 | Vaughn | |
| 5,717,923 | A | 2/1998 | Dedrick | |
| 5,721,827 | A | 2/1998 | Logan | |
| 5,724,521 | A | 3/1998 | Dedrick | |
| 5,740,549 | A | 4/1998 | Reilly | |
| 5,761,662 | A | 6/1998 | Dasan | |
| 5,794,210 | A | 8/1998 | Goldhaber | |
| 5,809,242 | A | 9/1998 | Shaw et al. | 709/217 |
| 5,823,879 | A | 10/1998 | Goldberg | |
| 5,838,790 | A | 11/1998 | McAuliffe et al. | 380/4 |
| 5,841,759 | A * | 11/1998 | Russ et al. | 370/221 |
| 5,848,397 | A * | 12/1998 | Marsh et al. | 705/14 |
| 5,913,040 | A | 6/1999 | Rakavy et al. | |
| 5,918,014 | A | 6/1999 | Robinson | |
| 5,933,811 | A | 8/1999 | Angles | |
| 5,946,646 | A | 8/1999 | Schena | |
| 5,946,664 | A | 8/1999 | Ebisawa | |
| 5,948,061 | A | 9/1999 | Merriman et al. | 709/219 |
| 5,959,623 | A | 9/1999 | van Hoff | |
| 6,009,409 | A | 12/1999 | Adler | |
| 6,009,410 | A | 12/1999 | LeMole | |
| 6,018,619 | A * | 1/2000 | Allard et al. | 709/224 |
| 6,026,368 | A | 2/2000 | Brown | |
| 6,036,601 | A | 3/2000 | Heckel | |
| 6,073,727 | A * | 6/2000 | DiFranza et al. | 187/396 |
| 6,085,229 | A | 7/2000 | Newman | |
| 6,119,098 | A * | 9/2000 | Guyot et al. | 705/10 |
| 6,128,667 | A * | 10/2000 | Jeffrey | 709/245 |
| 6,141,010 | A * | 10/2000 | Hoyle | 345/839 |
| 6,184,878 | B1 * | 2/2001 | Alonso et al. | 725/109 |
| 6,196,920 | B1 * | 3/2001 | Spaur et al. | 463/42 |
| 6,199,100 | B1 | 3/2001 | Filepp et al. | 709/203 |
| 6,202,054 | B1 * | 3/2001 | Lawlor et al. | 705/42 |
| 6,324,572 | B1 * | 11/2001 | Silverman et al. | 455/433 |
| 6,360,205 | B1 * | 3/2002 | Iyengar et al. | 705/5 |
| 6,360,261 | B1 * | 3/2002 | Boyd et al. | 709/224 |

FOREIGN PATENT DOCUMENTS

| | | |
|---|---|---|
| WO | WO 97/21183 | 6/1997 |
| WO | WO97/27531 | 7/1997 |
| WO | WO 97/27531 | 7/1997 |
| WO | WO 97/32257 | 9/1997 |
| WO | WO97/32257 | 9/1997 |
| WO | WO 97/32258 | 9/1997 |
| WO | WO97/32258 | 9/1997 |
| WO | WO9740447 A1 | 10/1997 |
| WO | WO 97/40447 | 10/1997 |
| WO | WO9740514 A1 | 10/1997 |
| WO | WO 97/40601 | 10/1997 |
| WO | WO9740601 A1 | 10/1997 |
| WO | WO 97/41673 | 11/1997 |
| WO | WO 97/43724 | 11/1997 |
| WO | WO97/43724 | 11/1997 |
| WO | WO97/46946 | 12/1997 |
| WO | WO 97/46946 | 12/1997 |
| WO | WO98/13761 | 4/1998 |
| WO | WO 98/35300 | 8/1998 |
| WO | WO9835300 A1 | 8/1998 |
| WO | WO 00/30008 | 5/2000 |

OTHER PUBLICATIONS

Rick Dedrick, *A Consumption Model for Targeted Electronic Advertising*, Intel Architecture Labs., 1995 IEEE, pp. 41–49.

Giorgio Brajnik and Carolo Tasso, *A Shell for Developing non–monotonic User Modeling Systems*,1994 Academic Press Limited, pp. 31–62.

Harty, Jeffrey D.; Aug. 31, 1999 letter addressed to Fred Randall re pending patent application filed by ASoftware.

Press Release: "dotNow! Free Internet Service Alerts More Competitors of Potential Patent Infringement".

* cited by examiner

INDEPENDENT INTERNET CLIENT OBJECT WITH AD DISPLAY CAPABILITIES

RELATED APPLICATION INFORMATION

This application is related to application Ser. No. 09/265,512 filed Mar. 9, 1999 entitled "Network Data Distribution Based Upon User-Specific Qualities," which is incorporated herein by reference, and which is a continuation-in-part of Application No. 60/077,331 filed Mar. 9, 1998 entitled "Network Data Distribution Based Upon Geographic Location, Usage Patterns, Interactive Data, Profile Data, Demographic Data and Scheduling Information."

This application is related to an application filed Jun. 3, 1999 entitled "Monitoring of Individual Internet Usage," which is incorporated herein by reference.

NOTICE OF COPYRIGHTS AND TRADE DRESS

A portion of the disclosure of this patent document contains material, which is subject to copyright protection. This patent document may show and/or describe matter, which is or may become trade dress of the owner. The copyright and trade cress owner has no objection to the facsimile reproduction by any one of the patent disclosure, as it appears in the Patent and Trademark Office patent files or records, but otherwise reserves all copyright and trade dress rights whatsoever.

BACKGROUND OF THE INVENTION

1. Field of the Invention

The present invention relates to display advertisements to a user of an online service.

2. Description of Related Art

Online services today offer a variety of services to their users. Users may access news, weather, financial, sports, and entertainment services, participate in and retrieve information from online discussion groups, and send and receive email. A user of an online service typically accesses the service using specialized communication software (i.e., client application or client software) that establishes and manages a connection from the user's computer (or client) to the online service provider's host computers (or servers) and facilitates the user's interactions with the service.

In addition to managing the connection, there is provided software to display pages or screens relating to retrieved content according to views or presentations specific to the online service. This software may be integrated with the client application. The functionality of the content and the user interface (i.e., icons, dialog boxes, menus, etc.) for interacting with the content are typically dictated by various standards.

Interactions between the user's computer and the online service are facilitated by a variety of software protocols (i.e., communication conventions, rules and structures), including application level protocols, for managing the transfer of data across the network and to the client application on the user's computer. A protocol may be proprietary or exclusive to an online service such that only client software from the online service provider may be used to communicate with the server software. For example, an online service provider th at supports electronic mail, discussion groups, chat groups, news services, etc. may define and use specific protocols for each type of service so that appropriate information is exchanged between the participants (i.e., clients and servers). Each application-specific protocol may be based on a common, underlying protocol.

The Internet and World Wide Web ("Web"), comprised of a vast array of international computer networks, many provide online service users with considerable information resources and other content. Typically, this content is accessed using a web browser, such as Microsoft Internet Explorer or Netscape Navigator, capable of understanding the HyperText Markup Language (HTML) used to create the documents found on the Web and the HyperText Transfer Protocol (HTTP) used to navigate the Web. Email and Usenet discussion groups are typically accessed through companion software to the browser. Although web browsers typically have varying levels of functionality or sophistication, retrieved content is displayed in content pages according to views or presentations specific to the web document currently presented by the web browser. Typically, the views and presentations are different than those provided by the communication software from the online service provider because the web browser is, in fact, a separate client application displaying web documents containing presentation directives.

When using a browser, the browser issues HTTP messages to request web pages. A requested web page is typically identified using its URL—uniform resource locator. The URL is a reference (or address) to a resource available on a TCP/IP network such as the Internet. A URL is composed of a character string, and may have a number of parts. These parts include a top level domain name, second level domain name, directory name, and file name. URLs may identify a file located on a web server. URLs may also point to other resources on the network such as database queries and command output. The determination and use of URLs is well known in the art and is not discussed further herein.

In some portions of this disclosure, the term "resource locator" is used. The term is defined as a string or code which uniquely identifies a resource on a network. Thus, the URL is a species of resource locator.

There are a number of types of online service providers. Online services may serve the general public or may serve a limited class of individuals. Some public OSPs utilize proprietary networks; America Online and @Home are examples. Other public OSPs use the public networks, and most Internet Service Providers (ISPs) are an example. OSPs often provide Internet access. Internet access is the primary service provided by some OSPs, most notably ISPs.

Users typically connect to an OSP using a computer with a communications device such as an analog modem, an Ethernet adapter, DSL adapter or cable modem. Such connections may be analog or digital, dial-up or constantly-connected. Subscribers typically pay a fee for their subscriptions to OSPs. These fees typically are in the form of a sign-up fee, plus online charges which are fixed (i.e., unlimited monthly access for a fixed fee) or based upon the amount of time the user is connected to the online service. The fees generally increase with bandwidth.

Some online service providers have derived revenue by displaying advertisements for third parties (hereinafter, "advertisements") to users. For example, when a user accesses a web page on the Web, an advertisement may be displayed to the user as part of the web page. Advertisements are also shown to users of some proprietary online services. Typically in such systems, each user accessing a certain screen or site is shown the same advertisement. Sophisticated systems have the capability to change the advertisement after a certain period of time.

Some attempts have been made to provide advertising-supported online services, including Internet access, on a free or heavily discounted basis. Typically, these online services required the user to use a special client application for connecting to the online service. The client application typically causes an advertising window to be displayed on the user's display. This advertising window remains visible and on top of other windows throughout the entire online session. The client application receives advertisements from the online service provider, and the client application displays the advertisements in the advertising window. It is unknown to the inventors, however, whether the transmission of advertisements from the online service provider to the client application is initiated by the online service provider or the client application, how the online service determines which advertisements to send to the users, and whether such typical client applications do anything more than open the communications link with the online service and display advertisements.

In one advertising based Internet service called Bigger.net, the client application periodically requested new advertisements from an ad server. A host computer monitored the time between such requests and terminated the connection if a preset period of time was exceeded. Bigger.net also had the ability to monitor network activity, though it is unclear how this was done.

Other advertising-supported online services have included: CyberFreeway, which used a client application developed by HyperNet, Inc. of Tokyo, Japan; Juno Online, which provided free email; Tritium and Freewwweb.

Advertisers find it desirable to target advertisements to relevant potential customers. For example, an advertiser of stockings would prefer to target women rather than men with its advertising. A Boston restaurant would prefer to target residents of Boston and business travelers rather than children living in San Francisco. Moreover, advertisers prefer to pay for advertising based upon the number of relevant consumers who are actually exposed to the advertisement. For typical online systems and networks, including the Web, it is often difficult for an advertiser to precisely determine whether its advertisements were actually viewed by a user and for how long, and whether the advertisement induced a response. Accordingly, there exists a need for a targeted advertisement system that also can provide information as to the characteristics of those who were exposed to each advertisement, for how long the user was exposed, and at what times.

It is believed that the prior art advertising-supported online services did not have the ability to target advertisements. Furthermore, their client applications are believed to have been limited in capabilities.

SUMMARY OF THE INVENTION

In accordance with the present invention, there is provided a client application for enabling access to an online service and displaying advertisements while the user has access to the online service. The client application receives play lists from the online service provider. The play lists include information about advertisements to be played and the order of play. The client application also receives match lists from the online service provider. The match lists include information about advertisements to be played when the user performs certain actions. The client application provides the user with the ability to cycle back through previously displayed advertisements, and to cycle forward. The client application displays advertisements continuously while the user has access to the online service, and also preferably displays advertisements during the delay between when the client application is activated and when the user can actually use the online service.

In conjunction with the client application displaying advertisements, the client application also records which advertisements were played. The client application displays a number of icons for functions available to the user, and the client application records when the user selects these and other functions. The client application also records certain pre-connection events, such as dial-up errors. The client application transmits these records to the online service provider.

Still further objects and advantages attaching to the system and to its use and operation will be apparent to those skilled in the art from the following particular description.

DESCRIPTION OF THE DRAWINGS

Further objects of this invention, together with additional features contributing thereto and advantages accruing therefrom, will be apparent from the following description of a preferred embodiment of the present invention which is shown in the accompanying drawings with like reference numerals indicating corresponding parts throughout and which is to be read in conjunction with the following drawings, wherein.

These and additional embodiments of the invention may now be better understood by turning to the following detailed description wherein an illustrated embodiment is described.

DETAILED DESCRIPTION OF THE INVENTION

Throughout this description, the preferred embodiment and examples shown should be considered as exemplars, rather than limitations on the apparatus and methods of the present invention.

The System of the Invention

The system of the invention enables data, such as advertisements, to be sent to users based upon: the user's geographic location; the user's interactive data; the user's network usage data; the user's personal profile information; the scheduling requirements of the data to be sent; and the demographic requirements of the data to be sent.

Figure 1:
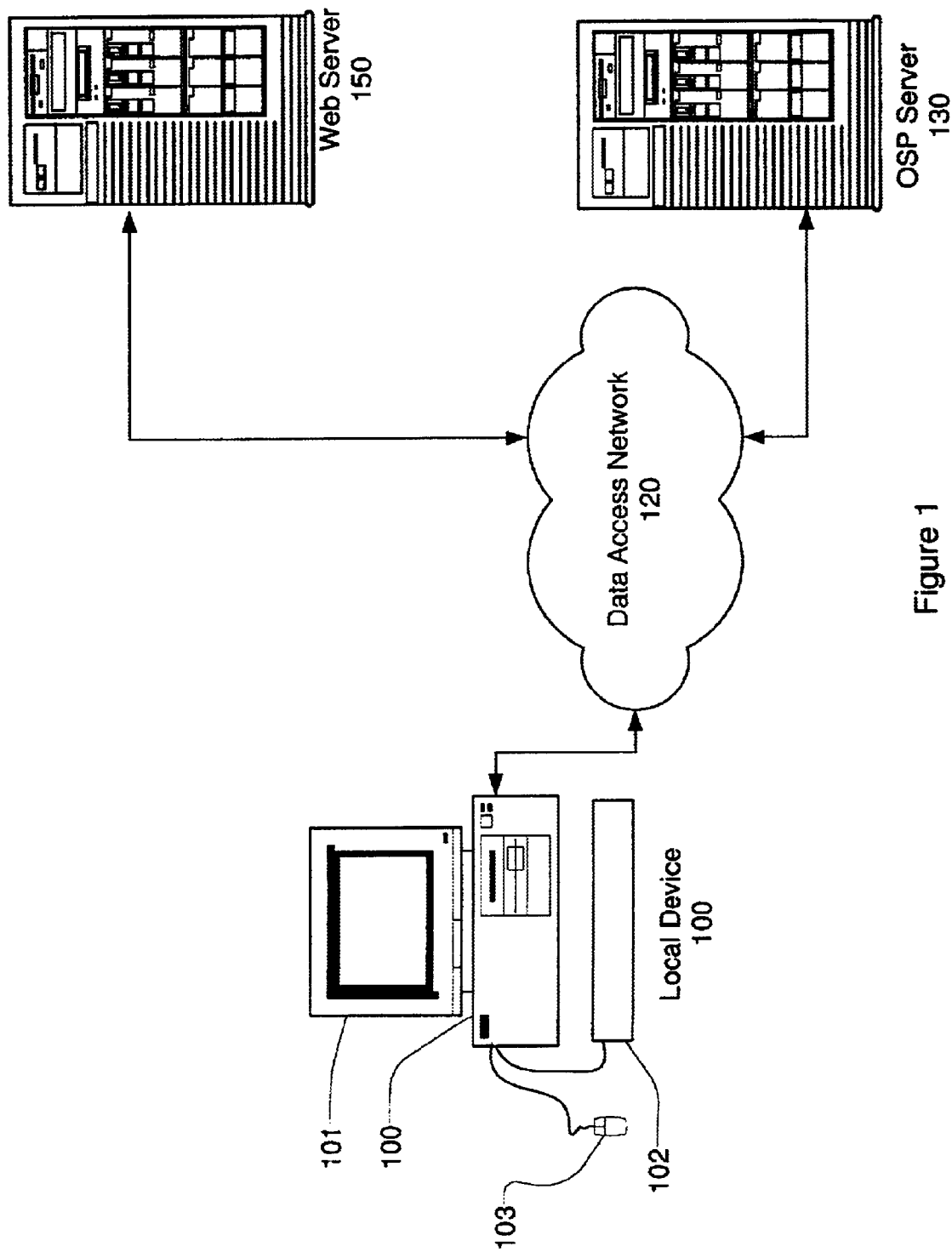
FIG. 1 is a first block diagram of a network data distribution system in accordance with the invention.

Referring now to FIG. 1, there is shown a block diagram of a network data distribution system in accordance with the invention in conjunction with a source of web pages. FIG. 1 includes a local device 100, a data access network 120, an OSP server 130 and a web server 150. The local device 100, the data access network 120 and the OSP server 130 comprise the network data distribution system. The local device 100 is provided online service to the network data distribution system under control of the OSP server 130. An online service provider controls the OSP server 130.

The local device 100 preferably comprises a client computer which is configured to access the OSP server 130 via the local access network 120. The client computer may be, for example, a PC running a Microsoft Windows operating system. The local device 100 preferably includes an output device, such as display 101, and an input device, such as keyboard 102 and/or pointing device 103 (e.g., mouse, track ball, light pen, or data glove). The local device 100 may also be, for example, an Internet appliance, network computer (NC), or an appropriately Internet-enabled device such as a portable digital assistant (PDA), mobile phone, refrigerator, etc. The particular type of device of the local device 100 is not considered to be important so long as the local device 100 can provide some measure of individual user interactivity with an online service.

The data access network 120 provides lower layer network support for the local device 100 to interact with online service, including the OSP server 130 and the web server 150. The data access network 120 preferably comprises a common or private bi-directional telecommunications network (e.g., a public switched telephone network (PSTN), a cable-based telecommunication network, a LAN, a WAN, a wireless network), coupled with or overlaid by a TCP/IP network (e.g., the Internet or an intranet).

The web server 150 may be of the type known in the art and has the ability to serve web pages to the local device 100, as requested in the manner known in the art. It should be appreciated that the web server 150 is representative of any source of web pages available to the local device 100. Thus, for example, the web server 150 could be accessible from the Internet, or it could be a part of an intranet and represents any number of web servers.

The OSP server 130 preferably is a computer system, such as a server computer. Alternatively, the OSP server 130 may be considered to represent a number of physical devices which as a group provide the indicated network services. The OSP server 130 acts as a recipient of certain information transmitted by the local device 100, as described further below. The OSP server 130 preferably also transmits certain data to the local device 100 as described further below.

Figure 2:
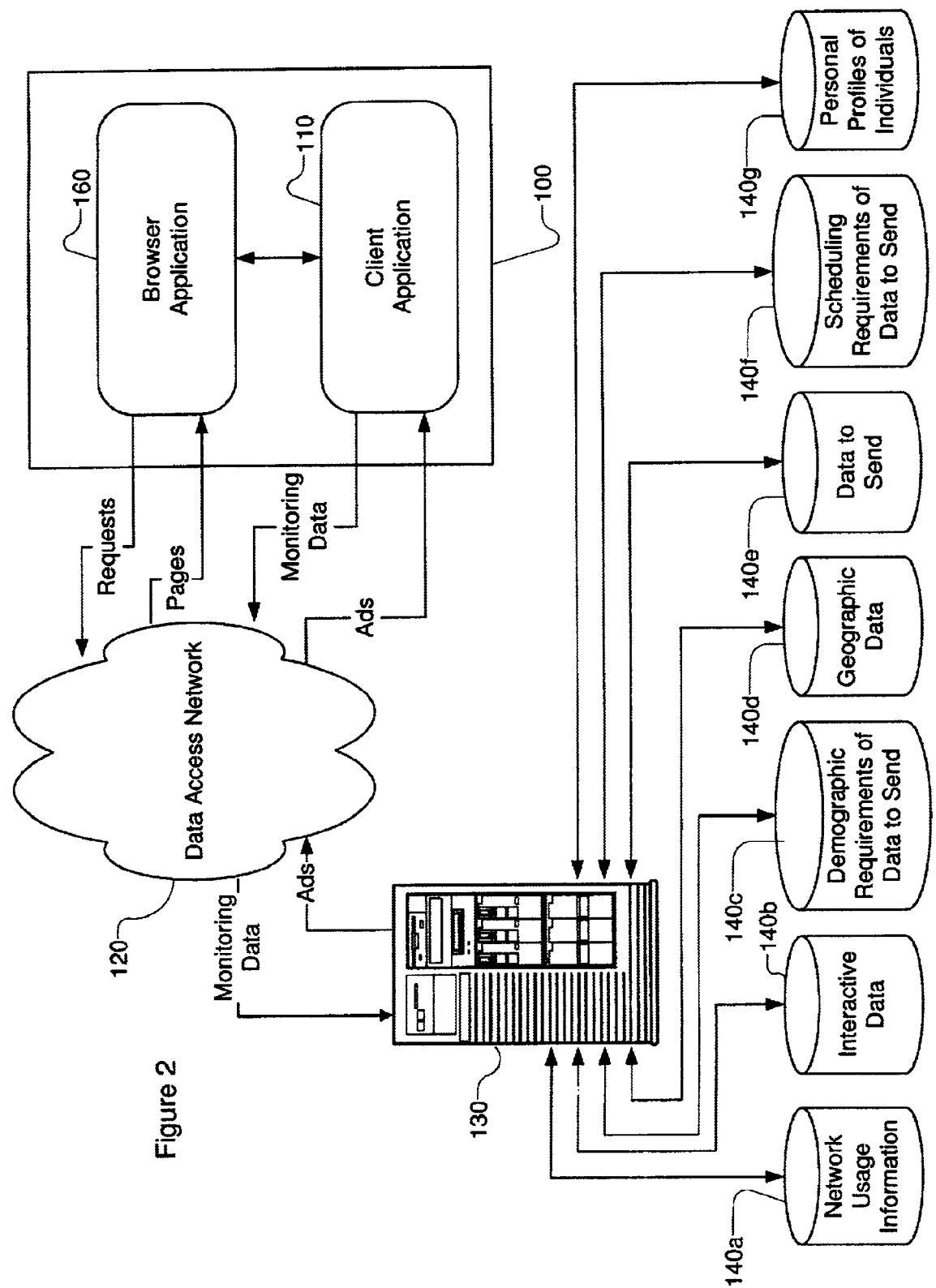
FIG. 2 is a second block diagram of a network data distribution system in accordance with the present invention.

Referring now to FIG. 2, there is shown a block diagram of a network data distribution system of an online service in accordance with the present invention. The system comprises a client application 110, the data access network 120, the OSP server 130 and data stores 140*a*–g (collectively, 140). A browser application 160 is also shown. A "browser application" is software which provides interactive utilization of hypertext objects located on a network, such as web pages on the Internet. As used herein, "browser application" also includes most email clients and ftp clients. The client application 110 is a program operative on local device 100, and preferably an independent application program or a DLL. The client application 110 preferably retrieves certain network data, displays certain network data, transmits geographic location data, transmits interactive user data, transmits network usage data and transmits personal profile information as described below. The client application 110 preferably also sets up and provides access to the online service. The data stores 140 store and provide this geographic information data 140*d*, network usage data 140*a*, interactive usage data 140*b*, personal profile information 140*g*, data to be sent 140*e*, schedule for transmitting data 140*f* and demographics for transmitting data 140*c*.

The browser application 160, such as Microsoft Internet Explorer or Netscape Navigator is preferably installed on the local device 100. When the local device 100 is connected to the web server 150 through the data access network 120, the user of the local device browses the web server 150 from the local device 100 using the browser application. The browser application itself need not be stored on the local device 100. The important aspect is that the user, from the local device 100, can exercise control over what web pages are requested and thus displayed by the local device 100.

Each time a user uses the local device 100 to connect to the online service, the client application 110 and the OSP server 130 establish a session. In this session, the client application 110 transmits certain information regarding the user of the local device 100 and his use of the local device 100 while connected to the online service. The OSP server 130, on the other hand, uses the information from the client application 100 to determine information which should be sent to the client application 110. Preferably, the information from the client application 110 is used by the OSP server 130 to select advertisements which the local device 100 should display. The client application 110 then causes these advertisements to be displayed on the local device's output device 101.

The information from the client application 110 regarding the user preferably includes geographic data and personal profile information. Geographic data indicating the user's current location preferably is sent from the client application 110 to the OSP server 130, which then stores the geographic data in the data store 140*d*. This geographic data can be something simple, like a phone number. The user preferably provides personal profile information on a periodic basis which is stored in the data store 140*g* and used by the OSP server 130. This information consists of (but is not limited to) things such as: age, sex, marriage status, home address and personal interests.

The information regarding the user's use of the local device 100 includes email usage, web usage and advertisement click-throughs. The user's interactions and feedback with the web server 150 provided through the browser application 160 are preferably captured by the client application 110, analyzed by the OSP server 130 and stored in the data store 140*b*. This includes the user's feedback and responses to the data delivered to the browser application 160. The user's activities on the web server 150 provided through the browser application 160 are preferably captured by the client application 110, analyzed by the OSP server 130 and stored in the data store 140*a*. This includes the type of network data the user requests and accesses. This data is preferably summarized and classified into multiple demographic profiles.

The data to be sent to users preferably has scheduling requirements that dictate when it should be sent. These scheduling requirements include (but are not limited to): frequency, maximum number of times to send to an individual, minimum number of times to send to an individual, time of day to send, and first and last days to send. The data to be sent to users can have demographic requirements that dictate to whom it should be sent. These include (but are not limited to): personal profile, interactive data, network usage information and geographic location.

Figure 3:
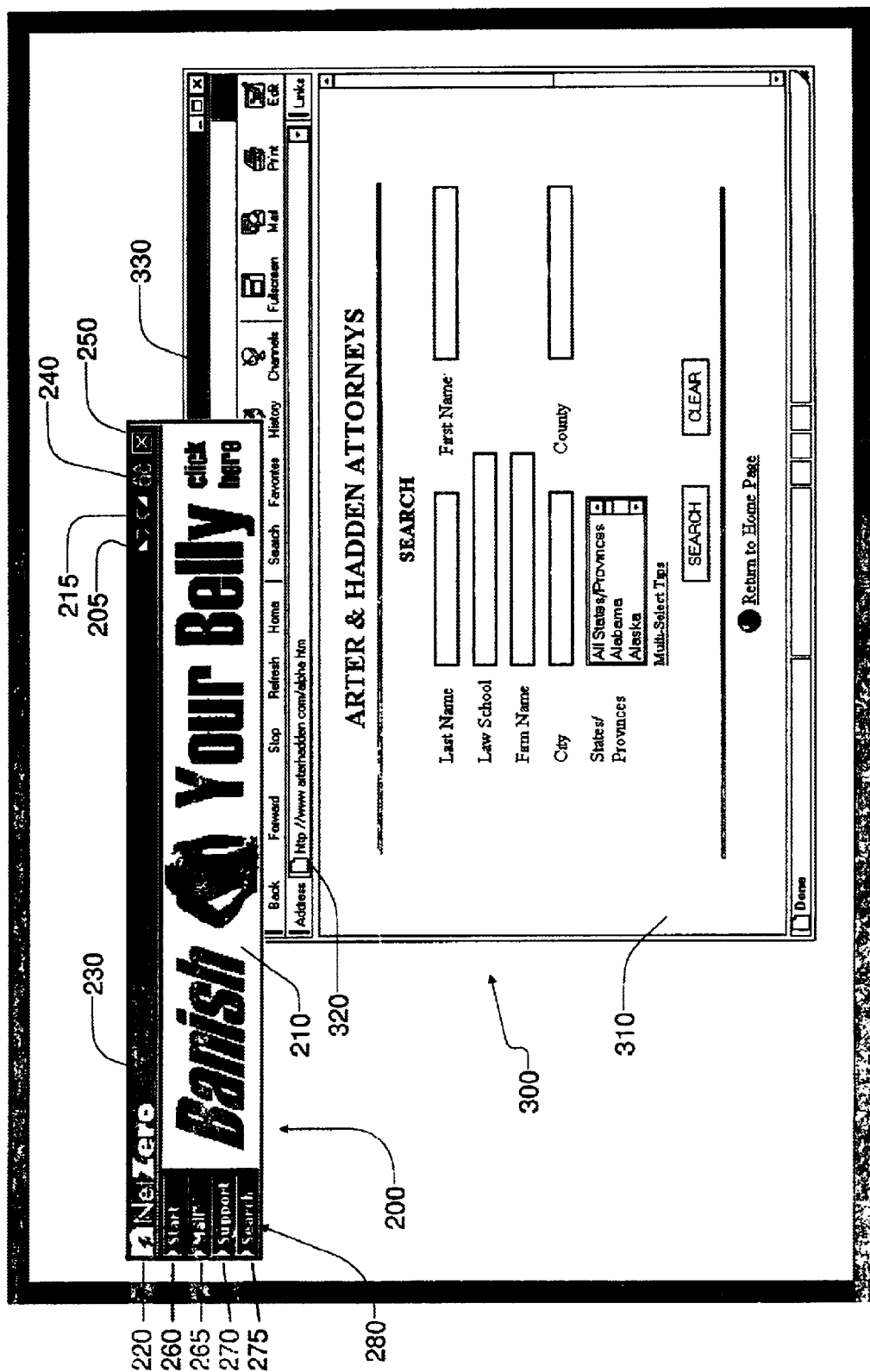
FIG. 3 is a representation of a display of a local device having a client window and a browser window.

Referring now to FIG. 3, there is shown the display 101 having a client window 200 and a browser window 300. The client window 200 is generated and controlled by the client application 110. The browser window is generated and controlled by the browser application 160, here Microsoft Internet Explorer. The browser window 300 is familiar to those skilled in the art, so the particulars are not described further herein. Further information regarding the use of most browser applications and their technical specifications is abundantly available.

The client window 200 includes a title bar 230, an advertising pane 210, a number of operational icons 205, 215, 220, 240, 250 on the title bar 230, and a number of button bar icons 260, 265, 270, 275 on a button bar 280. The title bar 230 preferably identifies the name of the OSP. The advertising pane 210 is a space in which the client application 110 displays advertisements.

The button bar icons 260, 265, 270, 275 preferably provide one-click access to Web pages and/or menus that might be useful to the user. The online service provider can sell the button bar icons to third parties as an additional revenue source. These icons 260, 265, 270, 275 are associated with particular URLs. The icon 260 is associated with a start page. The icon 265 is associated with an online shopping mall page. The icon 270 is associated with an online technical support page from the online service provider. The icon 275 is associated with an online search engine page. By clicking on any of these icons 260, 265, 270, 275, the client application 110 causes the browser application 160 to load the Web page having the URL associated with the selected icon.

The operational icons 205, 215, 240, 250, 280 on the title bar 230 preferably provide one-click access to operational features of the client application 110. As explained below, the client application 110 maintains records of the advertisements which have been displayed. The cycle back icon 205 allows the user to review advertisements which were previously displayed by the client application 110, in the reverse order in which the advertisements were displayed. If the user has cycled back through advertisements, the cycle forward icon 215 allows the user to review advertisements in the order in which the advertisements were displayed by the client application 110. The search icon 240 provides convenient access to online searching facilities. The close icon 250 causes the client window 200 to close, and thus also causes the session with the online service to terminate.

The menu icon 280 provides access to a menu of additional menu items and functions. The menu preferably provides alternative and enhanced access to the features associated with the button bar icons 260, 265, 270, 275 and the other operational icons 205, 215, 240, 250. In addition, the menu preferably provides the user with the ability to hide or show the title bar 230 and/or the button bar 280. The menu preferably also allows the user to access and edit his profile. The menu preferably provides the user with the option of positioning the client window 200 at any of a number of predefined positions, such as top left corner of the display 101, top right corner, bottom left corner, or bottom right corner.

The browser window 300 includes a display pane 310, an address bar 320 and a title bar 330. The display pane 310 is a region of the browser window 300 wherein the browser application causes web pages received by the browser application to be displayed. The address bar 320 is another region of the browser window 300 and the browser application displays URLs in the address bar 320 corresponding to the web page currently displayed in the display pane 310. The user can also enter a URL into the address bar 320, and the browser application will attempt to load the web page or other object to which the entered URL points. The primary feature of the title bar 330 is that it displays the title of the browser application. Another feature of most browsers is that the title bar 330 displays the title of the web page then displayed in the display pane 310.

The client window 200 is displayed on top of the browser window 300. Preferably, the client window 200 remains visible and on top of all other windows so long as the communication channel to the OSP server 130 is open. The client application 110 preferably can control the location of the client window 200 on the display 101. For example, the client application 10 preferably allows the user to select one of several predefined locations for the client window 200, such as lower left corner, upper right corner, etc. Some operating systems such as Microsoft Windows permit windows to be moved to the edge of the display 101 so that only a small portion of the window is visible. The client application 110 preferably can also prevent the client window 200 from being moved off of the visible area of the display 101. When the user attempts to hide all or a part of the client window 200, the client window preferably moves the client window 200 to a fully visible area of the display 101.

The Methods of the Invention

Figure 4:
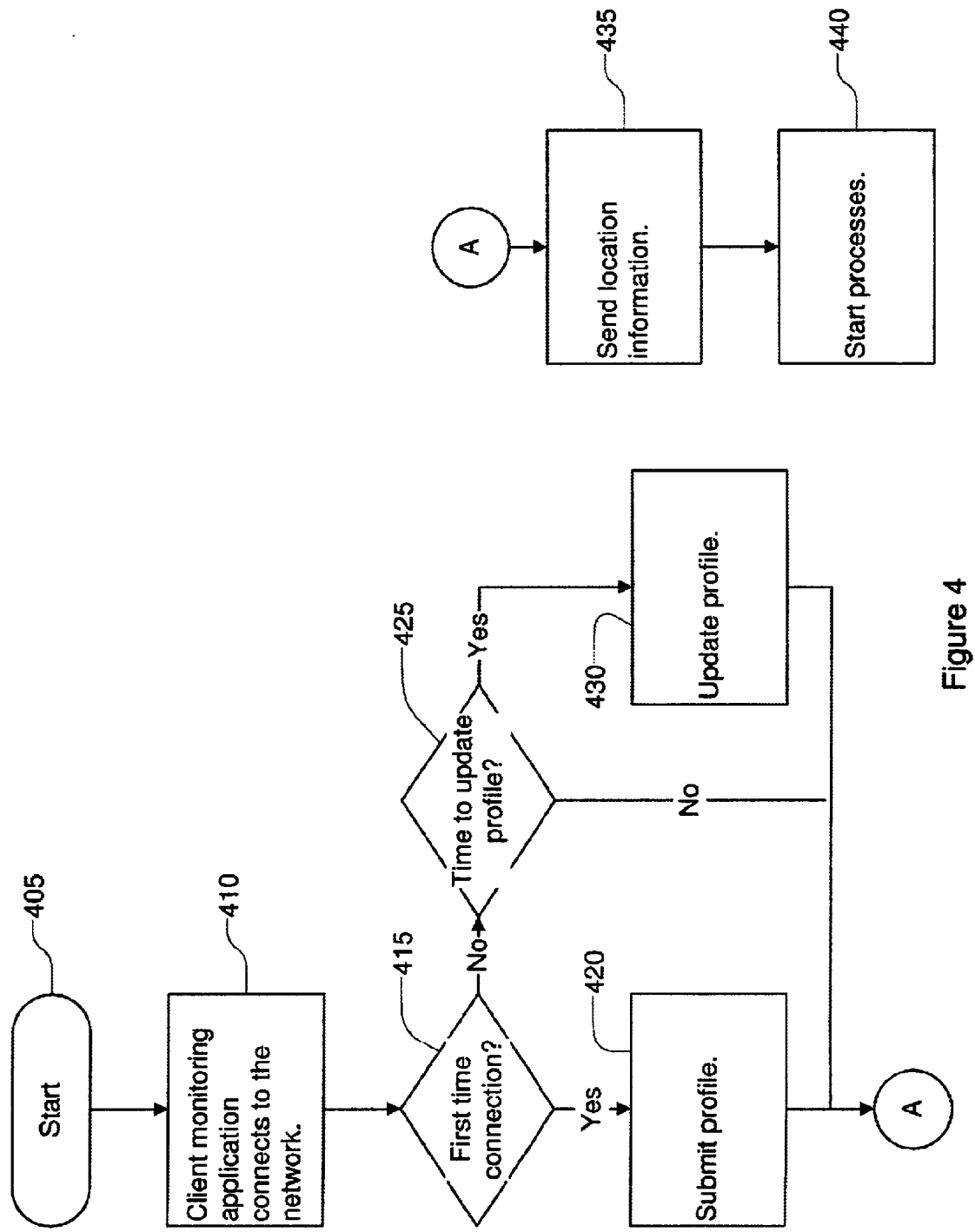
FIG. 4 is a flow chart of a method of monitoring web browsing by a user in accordance with the invention.

Referring now to FIG. 4, there is shown a flow chart of a method of distributing data in a network in accordance with the invention. The components 110, 120, 130, 140 work together to deliver data that meets the geographic and demographic criteria.

After the method begins (step 405), the user preferably uses the client application 110 to connect to the data access network 120, and then the OSP server 130 (step 410). The particular manner of the connection depends on the network infrastructure underlying the connections. The important aspect of this step 410 is that a communications channel is established between the client application 110 and the OSP server 130. By "communications channel," it is meant a logical path for data transmission. The OSP server 130 preferably acts as a gatekeeper to the online services. Only after the OSP server 130 has authorized access can the local device 100 access the web server 150 and the other resources of the online service.

The communication channel may be of two varieties—dial-up or constant-connection. In a dial-up communication channel, the connection to the online service becomes available only after the local device 100 creates a physical link to the online network and then a logical link to the online network. For example, the local device 100 has a -up communication channel if the local device 100 has a modem and connects through tone dialing to the online service using the PSTN. In a constant-connection communication channel, the connection to the online service is always available to the local device 100, and the local device need only create a logical link to the online network. For example, the local device 100 has a constant-connection communication channel when the local device 100 has a cable modem and connects to the online service using a cable service.

If this is the first time the user has connected (step 415), then the OSP server 130 preferably requires the user to use the local device 100 to submit personal profile information (step 420). Preferably, the OSP server 130 periodically will request (step 425) that the client application 110 have the user update this profile (step 430).

Each time the local device 100 connects to the OSP server 130, the OSP server 130 preferably obtains data indicating the local device's current geographic location (step 435). This geographic information is preferably derived from a local access phone number used by the client application 110 to connect to the data access network 120, and the client application 110 transmits its local access phone number to the OSP server 130 for geographic determination purposes.

Once connected, a number of processes are preferably started (step 440). In one of these processes, whenever the user interacts with data received on the client application 110, the client application 110 sends feedback information respecting this interaction to the OSP server 130. The OSP server 130 then summarizes and classifies the feedback information into demographic profiles stored in the data store 140.

In another of these processes, whenever a user uses the browser application 160 to request or access data from the web server 150, the client application 110 sends feedback information respecting these requests and data accesses to the OSP server 130. The OSP server 130 then summarizes and classifies this feedback information into the demographic profiles in the data store 140.

In another of these processes, while a user's local device 100 is connected to the web server 150, the OSP server 130 determines which targeted data needs to be sent to the client application 110 and then transmits this targeted data to the client application 110. The OSP server 130 accomplishes this by:

examining the scheduling requirements to determine which data needs to be sent;

examining the demographic requirements of the data to determine to which demographic profiles the data needs to be sent;

selecting the users who are currently connected that meet the demographic requirements of the data; and sending the data to the selected users.

As mentioned, one of the processes relates to the display of data, and particularly advertisements, in the client window 200. Methods of displaying advertisements to a user of an online services are described next.

Figure 5:
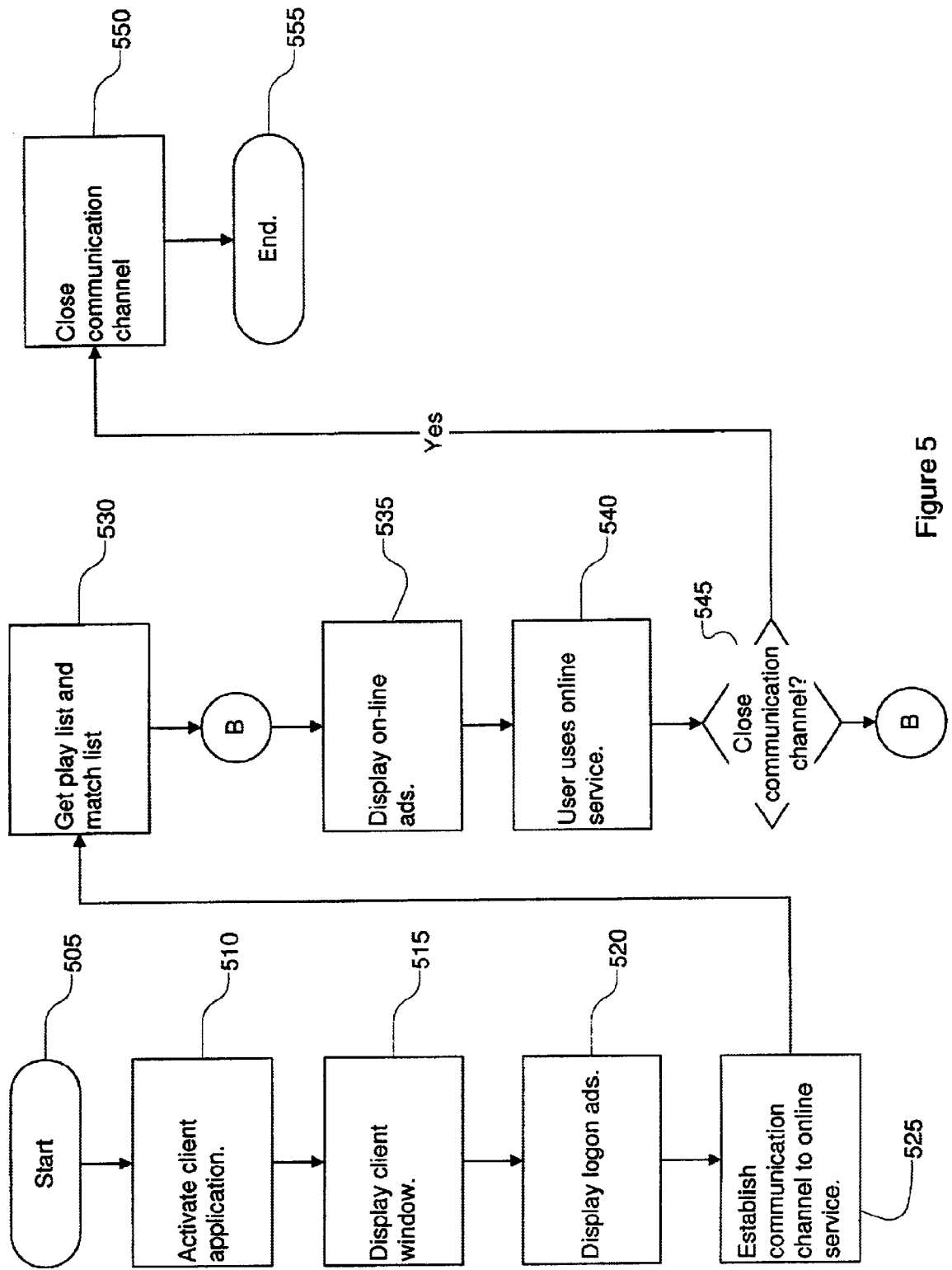
FIG. 5 is a flow chart of a method of displaying advertisements to a user of an online service in accordance with the invention.

Referring now to FIG. 5, there is shown a flow chart of a method of displaying advertisements to a user of an online service in accordance with the invention. This method generally involves the display of advertisements during a logon process and then also during usage of the online service.

After the method begins (step 505), the client application is activated (step 510). The client application 110 may be installed during manufacture of the local device 100, during use of the local device 100 at the instigation of the user, or may occur automatically as a consequence of other processes. Furthermore, the client application 110 may be activated either manually or automatically. Although at least some aspects of the client application 110 should be operable from the local device 100, the client application 110 need not be stored on the local device 100 and can be run from a remote location.

Preferably, after the client application 110 is activated, the client application 110 displays the client window 200 on the display 101 (step 515). In the next step (step 520), the client application 110 displays advertisements in the ad pane 210. In the case of dial-up and constant-connection communication channels, the communication channel to the online service might not yet be established or fully open at this point. Thus, the client application 110 cannot obtain the advertisements from the online service. Instead, the client application 110 obtains the advertisements locally. For example, during installation of the client application 110 one or more advertisements are installed on the local device 100 for display outside of a session. Alternatively, the advertisements may be downloaded to the local device at the beginning of a session, during a session, or as part of the termination of a session.

Where it is not desired to display advertisements prior to full establishment of the communication channel, then it is preferred also that the ad pane 210 not be displayed. In such embodiments, it might be desirable to provide a different configuration of the client window 200 than that shown in FIG. 3. For example, the client window 200 might show the status of the connection process.

The client application 110 preferably includes an ad display process which is responsible for displaying advertisements in the ad pane 210. The ad display process preferably operates in accordance with a play list. The play list comprises one or more ad objects. The ad objects are preferably data constructs which each include a resource locator of an advertisement to be displayed, a resource locator to be accessed if the user clicks on (or otherwise selects) the advertisement when displayed in the ad pane 210, and a number of attributes for the display of the advertisement. The display attributes may be one or more of, for example: fade, wash, sweep, fly, blinds, box, checkerboard, crawl, dissolve, peak, spiral, split, stretch, strips, swivel, wipe, zoom. These types of display attributes are well known (though not necessarily with respect to online services) and are therefore not described further herein. The ad objects preferably also specify how long the advertisement should be displayed. Other display attributes are within the scope of the invention. The play list preferably specifies an order in which the advertisements identified in the play list are to be displayed.

Typically, advertisements in the online industry are associated with a resource locator, and more typically with a URL. As is well known, when a user uses his pointing device 103 to click on an online advertisement in a browser's window such as browser window 300, the browser application loads the resource at the associated URL. This is commonly known as "click-through." In accordance with the invention, if during the display of an advertisement in the ad pane 210, the user clicks-through on the advertisement, then the client application 110 causes the resource locator associated with the advertisement to be loaded by the browser application 160. If the browser application 160 is not open at the time, then the browser application is first opened and then pointed to the resource locator associated with the advertisement. If the resource locator is not for a web page, the client application 110 or some other software in the local device 100 preferably causes the appropriate application to open so that the resource locator may be opened.

Preferably, the client application 110 displays advertisements from the time that the client application 110 is activated. To accomplish this, the client application 110 preferably is provided with a logon play list for use before the communication channel with the OSP server 130 is open. The client application 110 preferably is also provided with the advertisements referenced in the logon play list. The logon play list is preferably stored on the local device 100 during installation of the client application 110. Subsequently, during each session with the online service, the OSP server 130 provides a new logon play list and the advertisements referenced by the new logon play list to the client application 110 for use by the client application 110 during the next logon. The OSP server 130 can transmit the new logon play list in any of several ways, such as part of establishment of the communication channel to the OSP server 130, during the user's session with the online service, or as part of the closing of the communication channel. The latter is preferred, since it proves the online service provider with the best targeting control.

It should also be appreciated that, where there is a constant-connection communication link, a logon play list can be communicated from the OSP server 130 to the client application 110 at any time. Similarly, in some dial-up environments, such as ISDN, a logon play list can be communicated from the OSP server 130 to the client application 110 at any time using signaling channels or other off-line means.

In the next step (step 525), the client application 110 establishes a communication channel to the online service. With the communication channel established, the client application 110 can now receive a new play list from the OSP server 130 (step 530). This online play list can reference advertisements which are in the data access network 120. In some embodiments, it may be desirable for the OSP server 130 to transmit additional or replacement play lists and/or ad objects to the client application 110.

The client application 110 preferably also receives from the OSP server 130 a match list. The match list comprises one or more match objects. The match objects each comprise an activity identifier and an ad object. The match list guides the client application 110 to display certain advertisements notwithstanding the play list. The activity identifier preferably comprises resource locators and keywords which are used for targeting advertising to the user. The activity identifier may also be an object which altogether describes an online activity in which the user may become involved, such as email or chat.

During the user's session with the online service, the client application 110 preferably monitors the user's interaction with the data access network 120. If the user's interaction with the network matches one of the activity identifiers in the match list, then the ad display process displays the advertisement of the ad object corresponding to the matched activity identifier. Methods for monitoring the online activities of an online user are described in the related application referenced above.

The client application then displays advertisements in accordance with the online play list and the match list (step 535), and this continues while the user uses the online service (step 540).

As an example of the use of the match list, if the user points his browser application 160 to a Web site which the online service provider has previously identified to relate to sale of automobiles, then the online service provider preferably would run an advertisement targeting a potential purchaser of an automobile. The Web site may be identified from its URL, and if the URL is an activity identifier in the match list, the client application 110 can cause the appropriate advertisement to be displayed.

As another example, the user might go to a search engine which is known to the online service provider, and search for information about the sale of automobiles based upon the keywords "automobile sales." The client application 110 preferably checks if the keywords sent to these selected search engines are activity identifiers in the match list. If so, then the client application 110 preferably displays the appropriate advertisement.

At some point, the user's online session will end. To manually close the session, the user can select icon 250 in the client window 200 (FIG. 2). The client application 110 preferably provides the user with the opportunity to confirm the closing of the session (step 545). If the user cancels closure, then the method continues at step 535. If the user confirms closure, then the client application 110 closes the communication channel to the online service (step 550), and the method ends (step 555).

In addition to manual closure, the client application 110 preferably can automatically close the communication channel. In the case of a dial-up connection, the client application 110 preferably can detect inaction by the user. This inaction may be with respect to the data access network 120, or more preferably, with respect to the client application 110. If the user has been inactive for a predetermined period of time, then the client application 110 preferably displays a dialog on the display 101 in which the user is given some period of time to request that the session be continued.

In the case of a constant-connection communication channel, the client application 110 preferably monitors the user's activity with the local device 100 with respect to the online service and thereby detects whether the user is interacting with the online service. Like a screen saver in reverse, the client application 110 detects some period of inactivity and causes the client window 200 to be closed. Alternatively, the client window 200 could remain on the display even when the user's session is terminated, but the client application 110 would allow other windows to be displayed on top of the client window 200. If the user desired to open a session with the online service, the client window 200 would again have to be on top of all other windows, either through automatic or manual means.

As can be seen, this process permits browsing by the user and displaying of advertisements by the client application 100 without interfering with the user's use of the browser application.

Figure 6:
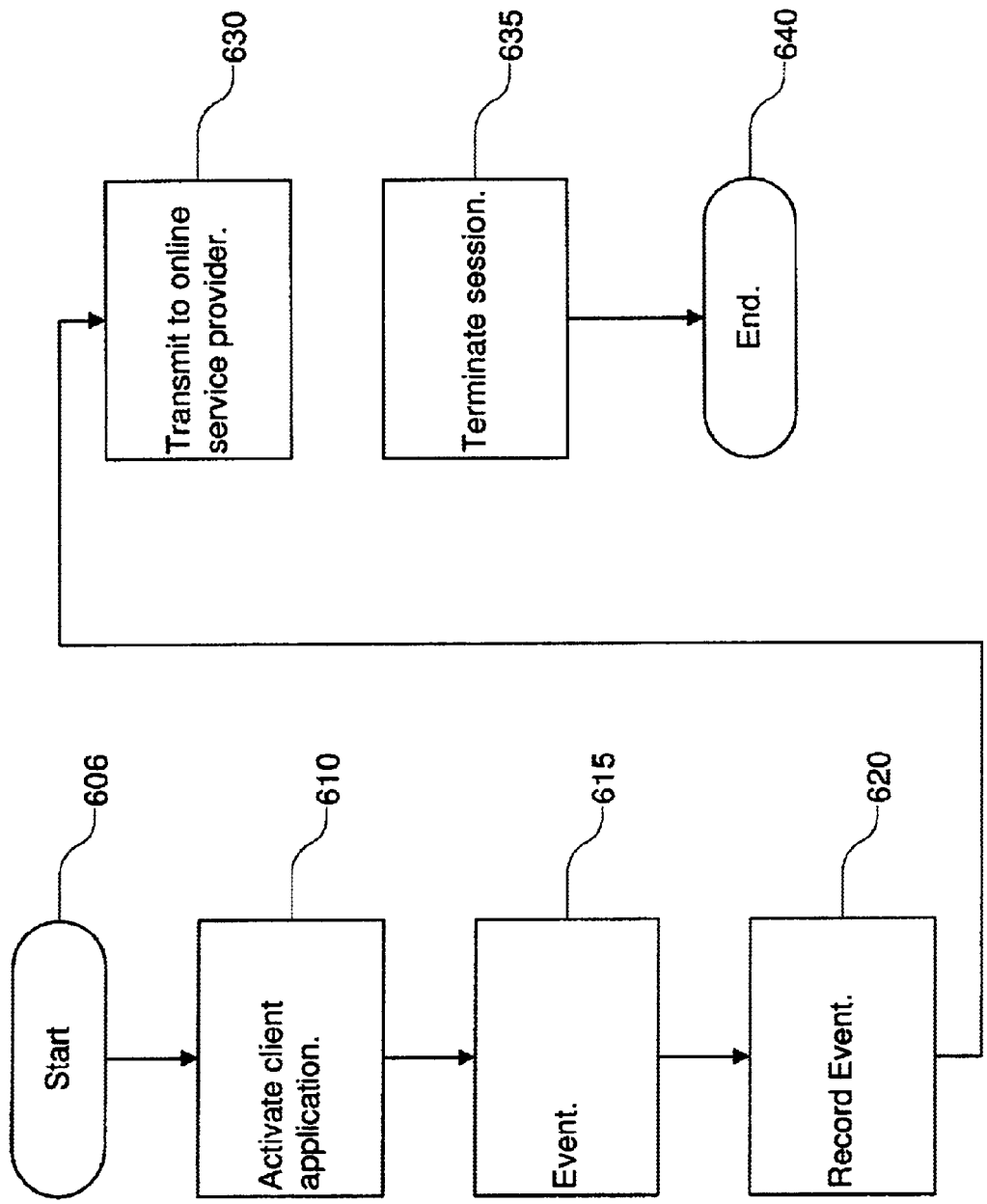
FIG. 6 is a flow chart of a method of tracking advertisement-related events in accordance with the invention.

In addition to the display of advertisements, the client application 110 preferably records a number of types of events and transmits these records to the OSP server 130. Tracked events fall into three categories: connection events, advertising events, and operational events. Referring now to FIG. 6, the event tracking capabilities of the client application 110 are described. Event tracking begins after the client application 110 is activated (step 610). After an event occurs (step 615), as described further below, the client application stores an event record (step 620). At a time appropriate for the event record, the client application 110 transmits the event record to an interactive data server such as the OSP server 130 (step 630). This continues until the session is terminated (step 635).

The connection events include failed connection attempts, such as when the client application 110 attempted a dial-up session and encountered no dial tone, a busy signal, or some other error from the physical network. The connection event records allow the online service provider to better understand where the users are experiencing difficulties, and to therefore remedy problems and enhance operations without necessitating user feedback. This is important because the connection event records may provide more timely and accurate information about a user's experiences, and further allows the online service provider to diagnose problems based upon common characteristics of users who have had problems.

The advertising events relate to the display of advertisements by the client application 110. Each time the client application 110 displays an advertisement (commonly referred to as an "impression"), the client application 110 preferably records an identifier of the advertisement. These records are used by the client application 110 to permit the user to cycle back through previously displayed advertisements, and then to cycle forward through the advertisements. Cycle-back and cycle-forward is made available to the user, for example, through the cycle-back icon 205 and the cycle-forward icon 215. The client application 110 preferably also records errors encountered in attempting to fetch and display advertisements.

In accordance with the invention, special attention is given to the user's selection of advertisements in the ad pane 210. To track the effectiveness of advertisements displayed in the ad pane 210, the client application 110 preferably tracks not only click-throughs, but also how long the client application displays an advertisement before the user clicks-through. This information, as well as records of what Web sites the user has browsed, are preferably used by the online service provider to enhance advertisement targeting criteria, to enable dynamic advertisement targeting, and to track the performance of advertisements displayed in the ad pane 210.

The operational events relate to the user's use of certain features of the client application 110. The operational events thus include attribute settings such as whether the user has hidden the title bar 230 and/or the button bar 280, and where the user has placed the client window 200 on the display 101. The client application 110 further recognizes as events each icon 205, 215, 240, 250, 260, 265, 270, 275, 280 which the user has selected (clicked-on). These operational event records allow the online service provider to better understand how the users are using the online service and to therefore enhance the quality of the client application 110 and the user's online experience.

In general, the client application 110 transmits most types of event records in a batch form. The online service provider preferably specifies the number of events to record before transmitting the event records, and this number preferably may be adjusted during a session. However, some event records should be transmitted without delay—most notably click-throughs. Click-throughs are not batched because the fact of these events is preferably used by the OSP server for refinement of dynamic advertisement targeting.

Although exemplary embodiments of the present invention have been shown and described, it will be apparent to those having ordinary skill in the art that a number of changes, modifications, or alterations to the invention as described herein may be made, none of which depart from the spirit of the present invention. All such changes, modifications and alterations should therefore be seen as within the scope of the present invention.

It is claimed:

1. A method of displaying advertisements to a user of an online service using a client application on a local device, the local device including an input device and an output device, the local device accessing the online service and providing interaction with the online service, the method comprising the steps of:

the client application becoming active;

the client application establishing a communication channel from the local device to the online service;

the client application receiving a first play list;

the client application displaying a client window on the output device of the local device, wherein the client window displays continuously so long as the communication channel from the local device to the online service is maintained;

the client application causing advertisements to be displayed in an ad pane of the client window, wherein the display of advertisements operates in accordance with the first play list, the first play list comprising plural ad objects, each ad object comprising a resource locator for a given advertisement and a resource locator for a click-through associated with the given advertisement, the first play list further specifying an order in which the advertisements identified in the first play list are to be displayed.

2. The method of displaying advertisements to a user of an online service using a client application on a local device of claim 1 further comprising the steps of:

the client application recording an identifier of a given advertisement displayed by the client application, and the client application transmitting the identifier to an interactive data server on the online service.

3. The method of displaying advertisements to a user of an online service using a client application on a local device of claim 1, wherein the ad object includes a length of time to display the given advertisement.

4. The method of displaying advertisements to a user of an online service using a client application on a local device of claim 1, further comprising the steps of:

the client application receiving a match list after establishment of the communication channel, the match list comprising at least one match object, each match object comprising an activity identifier and an ad object;

the client application monitoring the user's interaction with the online service; and if the user's interaction with the network matches one of the activity identifiers in the match list, then the client application causing the advertisement of the ad object of the match object corresponding to the matched activity identifier to be displayed in the display pane.

5. The method of displaying advertisements to a user of an online service using a client application on a local device of claim 1, the client application receiving the first play list from the online service after establishment of the communication channel.

6. The method of displaying advertisements to a user of an online service using a client application on a local device of claim 1, the ad objects further comprising display attributes, the display attributes including at least one of: fade, wash, sweep, fly, blinds, box, checkerboard, crawl, dissolve, peak, spiral, split, stretch, strips, swivel, wipe, zoom.

7. The method of displaying advertisements to a user of an online service using a client application on a local device of claim 1, wherein the client application causes the client window to be displayed on top of any other window which might be caused to be displayed on the output device.

8. A method of displaying advertisements to a user of an online service using a client application on a local device, the local device including an input device and an output device, the local device accessing the online service and providing interaction with the online service, the method comprising the steps of:

the client application becoming active;

the client application causing advertisements to be displayed on the output device of the local device in accordance with a first play list, the first play list comprising plural ad objects, each ad object having associated therewith a given advertisement;

the client application displaying a first advertisement referenced from the first play list;

the client application establishing a communication channel to the online service;

wherein during the establishment of the communication channel, the client application displays advertisements from the first play list.

9. The method of displaying advertisements to a user of an online service using a client application on a local device of claim 8 further comprising the step of installing the client application on the local device, wherein the first play list is created on the local device during the installing step.

10. The method of displaying advertisements to a user of an online service using a client application on a local device of claim 8 further comprising:

the client application establishing a first communication session with the online service;

the client application receiving a second play list from the online service, the second play list comprising at least one ad object, each ad object having associated therewith a given advertisement;

the client application terminating the first communication session with the online service;

the client application establishing a second communication channel to the online service;

wherein during the establishment of the second communication channel, the client application displays advertisements from the second play list.

11. The method of displaying advertisements to a user of an online service using a client application on a local device of claim 8, further comprising the client application establishing a first communication session with the online service;

the client application receiving a second play list from the online service the second play list comprising at least one ad object;

wherein the step of receiving a second play list is performed as part of the step of establishing a communication channel.

12. The method of displaying advertisements to a user of an online service using a client application on a local device of claim 10, wherein the receiving step is performed as part of the terminating step.

13. The method of displaying advertisements to a user of an online service using a client application on a local device of claim 8, wherein the client application causes the client window to be displayed on top of any other window which might be caused to be displayed on the output device.

14. The method of displaying advertisements to a user of an online service using a client application on a local device of claim 8 further comprising the steps of:

the client application recording an identifier of a given advertisement displayed by the client application, and the client application transmitting the identifier to an interactive data server on the online service.

15. A method of displaying advertisements to a user of an online service using a client application on a local device, the local device including an input device and an output device, the local device accessing the online service and providing interaction with the online service, the method comprising the steps of:

the client application becoming active;

the client application establishing a first communication channel to the network;

the client application receiving a match list from an ad server after establishment of the first communication channel, the match list comprising plural match objects comprising an activity identifier and an ad object, the ad object comprising a resource locator for a given advertisement and a resource locator for a click-through associated with the given advertisement;

the client application monitoring the user's interaction with the network; and if the user's interaction with the network matches one of the activity identifiers in the match list, then displaying in a display pane of a client window on the output device of the local device the advertisement of the ad object of the match object corresponding to the matched activity identifier.

16. The method of displaying advertisements to a user of an online service using a client application on a local device of claim 15, wherein the activity identifier comprises a resource locator.

17. The method of displaying advertisements to a user of an online service using a client application on a local device of claim 16, wherein the activity identifier comprises a second level domain name.

18. The method of displaying advertisements to a user of an online service using a client application on a local device of claim 15, wherein the client application causes the client window to be displayed on top of any other window which might be caused to be displayed on the output device.

19. The method of displaying advertisements to a user of an online service using a client application on a local device of claim 15 further comprising the steps of:

the client application recording an identifier of a given advertisement displayed by the client application, and the client application transmitting the identifier to an interactive data server on the online service.

20. A method of displaying advertisements to a user of an online service using a client application on a local device, the local device including an input device and an output device, the local device accessing the online service and providing interaction with the online service, the local device receiving advertisements from the online service, the method comprising the steps of:

the client application becoming active;

the client application establishing a first communication channel to the online service;

the client application displaying a client window on the output device of the local device, wherein the client window displays on top of any other window which might be caused to be displayed on the output device and continuously so long as the first communication channel is maintained, the client window including a plurality of user-selectable icons, each icon being associated with a given function of the client application;

the client application causing advertisements received from the online service to be displayed in an ad pane of the client window;

the client application detecting the user's selection of a given icon;

the client application providing the functionality associated with the given icon;

the client application recording a first event record, the first event record identifying the user's selection of the given icon;

the client application transmitting the first event record to the online service.

21. The method of displaying advertisements to a user of an online service using a client application on a local device of claim 20, the method further comprising the steps of:

during the display of a given advertisement in the ad pane, the user using the input device to select the ad pane;

the client application determining a resource locator associated with the given advertisement in the ad pane;

the client application recording a second event record, the second event record identifying the user's selection of the given advertisement;

the client application issuing a command to the local device to load the object at the location identified by the resource locator; and the client application transmitting the second event record to the interactive data server.

22. The method of displaying advertisements to a user of an online service using a client application on a local device of claim 20, wherein the user-selectable icon includes a cycle-back icon, the cycle-back icon being associated with a cycle-back function, in the step of the client application detecting the user's selection of a given icon, the client application detecting the user's selection of the cycle-back icon, in the step of the client application providing the functionality associated with the given icon, the client application determining a next prior advertisement which the ad display process caused to be displayed, and the ad display process displaying the next prior advertisement.

23. The method of displaying advertisements to a user of an online service using a client application on a local device of claim 20 wherein the user-selectable icon includes a cycle-forward icon, the cycle-forward icon being associated with a cycle-forward function, in the step of the client application detecting the user's selection of a given icon, the client application detecting the user's selection of the cycle-forward icon, in the step of the client application providing the functionality associated with the given icon, the client application determining a next advertisement which the ad display process caused to be displayed, if any, and the ad display process displaying the next advertisement.

* * * * *